(12) United States Patent
Song et al.

(10) Patent No.: US 9,791,746 B2
(45) Date of Patent: Oct. 17, 2017

(54) LIQUID CRYSTAL DISPLAY PANEL

(71) Applicant: Shenzhen China Star Optoelectronics Technology Co., Ltd., Shenzhen (CN)

(72) Inventors: Yanjun Song, Shenzhen (CN); Chungching Hsieh, Shenzhen (CN); Yongchao Zhao, Shenzhen (CN); Xiang Li, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 174 days.

(21) Appl. No.: 14/892,201

(22) PCT Filed: Oct. 28, 2015

(86) PCT No.: PCT/CN2015/093076
§ 371 (c)(1),
(2) Date: Nov. 19, 2015

(87) PCT Pub. No.: WO2017/063231
PCT Pub. Date: Apr. 20, 2017

(65) Prior Publication Data
US 2017/0192306 A1    Jul. 6, 2017

(30) Foreign Application Priority Data

Oct. 14, 2015  (CN) .......................... 2015 1 0663021

(51) Int. Cl.
*G02F 1/1343* (2006.01)
*G02F 1/1337* (2006.01)
(Continued)

(52) U.S. Cl.
CPC ...... *G02F 1/133753* (2013.01); *G02F 1/1368* (2013.01); *G02F 1/133345* (2013.01);
(Continued)

(58) Field of Classification Search
CPC ... G02F 1/134363; G02F 2001/134372; G02F 1/133753; G02F 2001/133749;
(Continued)

(56) References Cited

U.S. PATENT DOCUMENTS

| 2008/0218645 A1* | 9/2008 | Zhu | G02F 1/134363 349/33 |
| 2012/0169981 A1* | 7/2012 | Murata | G02F 1/134363 349/138 |

(Continued)

*Primary Examiner* — Jia Pan
(74) *Attorney, Agent, or Firm* — Leong C. Lei (57) ABSTRACT

The present invention provides a liquid crystal display panel. The liquid crystal display panel includes a TFT substrate and a CF substrate that are respectively provided with first and second alignment films that allow for vertical light alignment, so that after irradiation of ultraviolet light, the first alignment film and the second alignment film have alignment directions that are substantially parallel but opposite to each other and the liquid crystal molecules are set at a tilt angle for being nearly vertically aligned. In a dark state where no electricity is applied, the liquid crystal molecules are arranged to be nearly perpendicular to surfaces of the TFT substrate and the CF substrate with no phase difference so that light leakage is extremely low and the dark state brightness is small thereby achieving a relatively high contrast; and after the application of a displaying electric field, the liquid crystal molecules are cause to rotate on a plane substantially parallel to the surfaces of the TFT substrate and the CF substrate so as to provide characteristics of a wide view angle and high transmittance offered by an IPS mode and an FFS mode.

14 Claims, 6 Drawing Sheets

(51) Int. Cl.
 G02F 1/1362 (2006.01)
 G02F 1/1333 (2006.01)
 G02F 1/1368 (2006.01)
 G02F 1/1335 (2006.01)

(52) U.S. Cl.
 CPC .. *G02F 1/133514* (2013.01); *G02F 1/133788* (2013.01); *G02F 1/134363* (2013.01); *G02F 1/136286* (2013.01); *G02F 2001/133742* (2013.01); *G02F 2001/133749* (2013.01); *G02F 2001/133757* (2013.01); *G02F 2001/133761* (2013.01); *G02F 2001/134372* (2013.01); *G02F 2201/121* (2013.01); *G02F 2201/123* (2013.01)

(58) Field of Classification Search
 CPC ........ G02F 2001/133742; G02F 2001/133757; G02F 2001/133761; G02F 1/133788; G02F 2001/133746; G02F 2001/133738
 See application file for complete search history.

(56) References Cited

U.S. PATENT DOCUMENTS

| | | | |
|---|---|---|---|
| 2013/0162937 A1* | 6/2013 | Lu | G02F 1/13439 349/123 |
| 2015/0049269 A1* | 2/2015 | Okazaki | G02F 1/1337 349/33 |
| 2017/0212390 A1* | 7/2017 | Miyake | G02F 1/133711 |

* cited by examiner

(Prior Art)

Fig. 1

(Prior Art)

LIQUID CRYSTAL DISPLAY PANEL

BACKGROUND OF THE INVENTION

1. Field of the Invention

The present invention relates to the field of display technology, and in particular to a liquid crystal display panel.

2. The Related Arts

A liquid crystal display panel is generally made up of a color filter (CF) substrate, a thin-film transistor (TFT) array substrate, and a liquid crystal layer arranged between the two substrates and the operation principle is that a drive voltage is applied to the two glass substrates to control liquid crystal molecules of the liquid crystal layer to rotate in order to refract out light from a backlight module to generate an image. Based on the way of orientating liquid crystal, the liquid crystal display panels of the main stream market can be classified as the following types: vertical alignment (VA), twisted nematic (TN) or super twisted nematic (STN), in-plane switching (IPS), and fringe field switching (FFS).

For the VA mode, a liquid crystal display device is generally made up of upper and lower substrates and negative liquid crystal molecules interposed between the two substrates. A transparent conductor layer (indium tin oxide, ITO) is formed on an inside surface of each of the upper and lower substrates in order to form a vertical electric field. Negative liquid crystal is embedded between the two transparent conductor layers so that the liquid crystal molecules are oriented perpendicular to the surfaces of the substrate when no vertical electric field applies thereto, and the liquid crystal molecules are oriented at a specific direction and are eventually lined up in a direction perpendicular to the electric field when a vertical electric field applies thereto.

The VA mode has advantages in respect of image displaying including high contrast and high transmittance. However, since the VA mode adopts liquid crystal of vertical rotation, the difference of birefringence of the liquid crystal modules is relatively large, leading to a poor view angle and a relatively severe issue of color shifting at a large view angle. Often, multi-domain VA techniques are adopted, in which a sub-pixel is divided into multiple areas and the liquid crystal molecules of the areas are made to rotate at different angles when a voltage is applied thereto in order to alleviate the color shifting issue.

Figure 1:
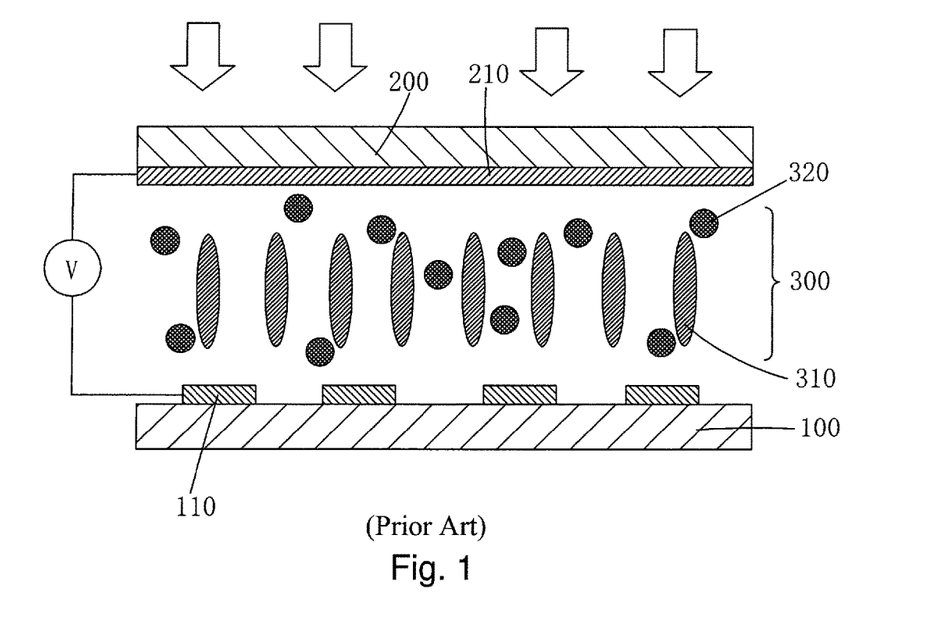
FIG. 1 is a cross-sectional view illustrating the structure of conventional PSVA mode liquid crystal display panel.
Figure 2:
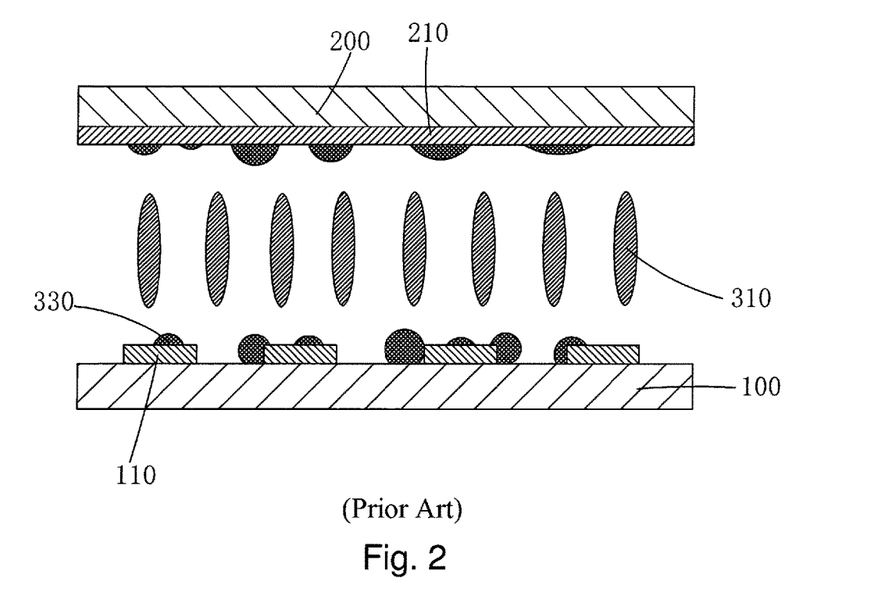
FIG. 2 is a schematic view illustrating the state of liquid crystal molecules contained in the conventional PSVA mode liquid crystal display panel when no electric field is applied.
Figure 3:
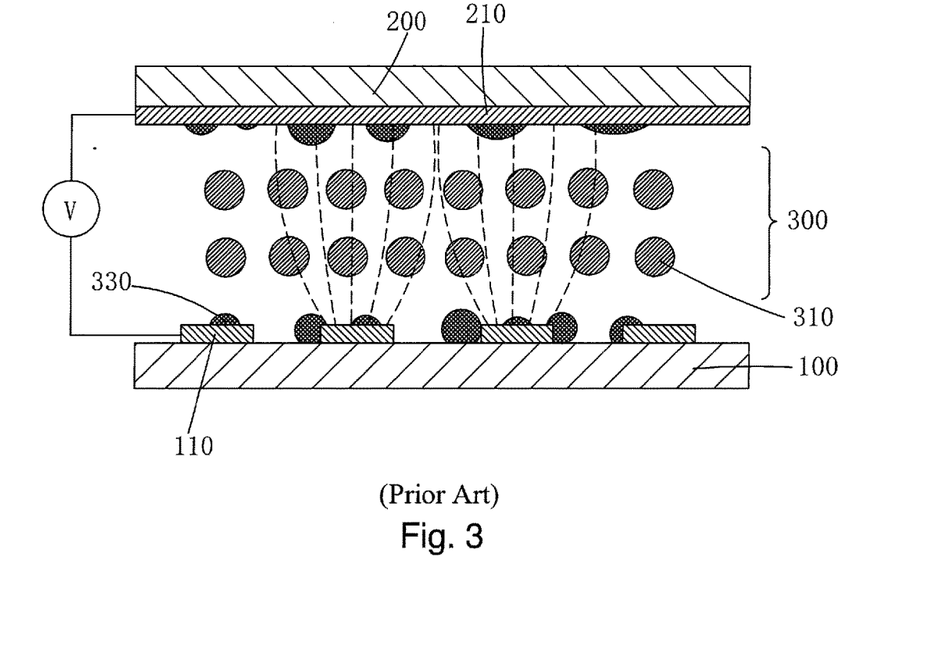
FIG. 3 is a schematic view illustrating the state of liquid crystal molecules contained in the conventional PSVA mode liquid crystal display panel when an electric field is applied.

With the advance of technology, a polymer sustained vertical alignment (PSVA) mode that requires no alignment film has been proposed. As shown in FIG. 1, a PSVA mode liquid crystal display panel comprises a first substrate 100, a second substrate 200 that is opposite to the first substrate 100, a liquid crystal layer 300 interposed between the first substrate 100 and the second substrate 200, pixel electrodes 110 that are arranged on the first substrate 100 and spaced from each other; and a common electrode 210 that is arranged on the a side of the second substrate 200 that is adjacent to the liquid crystal layer 300 and covers the second substrate 200. The liquid crystal layer 300 is composed of a number of liquid crystal molecules 310 and a number of reactive monomers 320. After the first substrate 100 and the second substrate 200 are combined together and the liquid crystal layer 300 is filled, a voltage is applied to the common electrode 210 and the pixel electrodes 110 to have the liquid crystal molecules 310 tilt following the direction of slits of the electrode pixels 310. Then, ultraviolet (US) rays are applied for irradiation so as to cause reaction of the reactive monomers 32 for forming reactant projections 330 attached to surfaces of the pixel electrodes 110 and the common electrode 210, as shown in FIG. 2, wherein the reactant projections 330 function to constrain the liquid crystal molecules 310 to form a pre-tilt angle at a predetermined direction. As shown in FIG. 3, when a vertical electric field is applied, the liquid crystal molecules 310 are caused to orient at a specific direction and eventually lined up at a direction perpendicular to the electric field.

The PSVA mode has the characteristics of fast response and high contrast. However, due to the inclusion of the reactive monomers in the liquid crystal layer to participate in the alignment process, the choice of the liquid crystal is greatly constrained, readily leading to an issue of dependency, and severe requirements may be imposed on the manufacturing process and the materials used.

The IPS mode and FFS mode have the characteristics of having wide view angles; however contrast is poor as compared to the VA mode.

SUMMARY OF THE INVENTION

An object of the present invention is to provide a liquid crystal display panel that integrates the advantages of the IPS mode and FFS mode with the VA mode so as to greatly improve contrast, increase transmittance, and show the characteristics of wide view angles.

To achieve the above object, the present invention provides a liquid crystal display panel, which comprises a thin-film transistor (TFT) substrate, a color filter (CF) substrate opposite to the TFT substrate, and a liquid crystal layer interposed between the TFT substrate and the CF substrate;

the TFT substrate comprising a first base plate and a common electrode, an insulation layer, a pixel electrode, and a first alignment film that are sequentially stacked, from bottom to top, on a surface of the first base plate that is close to the liquid crystal layer;

the CF substrate comprising a second substrate and a second alignment film that is arranged on a surface of the second substrate that is close to the TFT substrate;

the liquid crystal layer comprising liquid crystal molecules that are set at a pre-tilt angle for being nearly vertically aligned; on a plane substantially parallel to the TFT substrate and the CF substrate, the liquid crystal molecules and a direction of branch electrodes of the pixel electrode defining therebetween a direction angle $\theta$ and the direction angle $\theta$ ranging from 0 to 45 degrees;

the first alignment film and the second alignment film being alignment films that allow for vertical light alignment; the first alignment film being subjected to first light irradiation treatment to have the first alignment film define a first pre-tilt angle with respect to the first base plate; the second alignment film being subjected to second light irradiation treatment to have the second alignment film define a second pre-tilt angle with respect to the second substrate; and the first and second pre-tilt angles ranging from 0 to 20 degrees;

an alignment direction of the first alignment film and an alignment direction of the second alignment film being opposite to and parallel with each other; and the liquid crystal molecules rotating horizontally upon application of an electric field for displaying.

The TFT substrate further comprises scan lines extending in a horizontal direction and data lines extending in a vertical direction. The scan lines and the data lines intersect each other on the TFT substrate to define a plurality of sub-pixel zones. Each of the sub-pixel zones is provided with a pixel electrode.

The pixel electrode comprises a plurality of branch electrodes and a plurality of slits between the plurality of branch electrode. The slits extend in a direction that is the vertical direction.

The alignment direction of the first alignment film and the extension direction of the slits define therebetween an angle θ and the alignment direction of the second alignment film and the extension direction of the slits define therebetween an angle −θ; and the liquid crystal of the liquid crystal layer is positive liquid crystal.

The alignment direction of the first alignment film and the horizontal direction define therebetween an angle θ and the alignment direction of the second alignment film and the extension direction of the horizontal direction define therebetween an angle −θ; and the liquid crystal of the liquid crystal layer is negative liquid crystal.

The pixel electrode comprises first and second areas. The first area comprises a plurality of first branch electrodes and a plurality of first slits between the plurality of first branch electrodes. The second area comprises a plurality of second branch electrodes and a plurality of second slits between the plurality of second branch electrodes. An extension direction of the first slits and the vertical direction define therebetween a predetermined angle α and an extension direction of the second slits and the vertical direction define therebetween a predetermined angle −α.

The alignment direction of the first alignment film is in the horizontal direction and the alignment direction of the second alignment film is also in the horizontal direction; and the liquid crystal of the liquid crystal layer is negative liquid crystal.

The alignment of the first alignment film corresponding to the first area of the pixel electrode is in a vertical upward direction and the alignment direction of the first alignment film corresponding to the second area of the pixel electrode is in a vertical downward so as to define two domains of one of the sub-pixel zones in which the liquid crystal molecules, upon application of voltage, rotate by different angles; the alignment direction of the second alignment film corresponding to the first area of the pixel electrode is in the vertical downward direction and the alignment direction of the second alignment film corresponding to the second area of the pixel electrode is in the vertical upward direction; and the liquid crystal of the liquid crystal layer is positive liquid crystal.

The alignment direction of the first alignment film corresponding to the first area of the pixel electrode and the horizontal direction define therebetween an angle θ and the alignment direction of the first alignment film corresponding to the second area of the pixel electrode the second area and the horizontal direction define therebetween an angle −θ so as to define two domains of one of the sub-pixel zones in which the liquid crystal molecules, upon application of voltage, rotate by different angles; the alignment direction of the second alignment film corresponding to the first area of the pixel electrode and the horizontal direction therebetween define an angle −θ and the alignment direction of the second alignment film corresponding to the second area of the pixel electrode and the horizontal direction define therebetween an angle θ; the liquid crystal of the liquid crystal layer is negative liquid crystal.

The liquid crystal molecules of the liquid crystal layer are subjected to an alignment process including individually subjecting the first alignment film and the second alignment film to exposure to ultraviolet light to allow the liquid crystal molecules to form a pre-tilt angle of a predetermined angle value. The ultraviolet light for exposure has a wavelength of 200-500 nm.

The present invention also provides a liquid crystal display panel, which comprises a TFT substrate, a CF substrate opposite to the TFT substrate, and a liquid crystal layer interposed between the TFT substrate and the CF substrate;

the TFT substrate comprising a first base plate and a common electrode, an insulation layer, a pixel electrode, and a first alignment film that are sequentially stacked, from bottom to top, on a surface of the first base plate that is close to the liquid crystal layer;

the CF substrate comprising a second substrate and a second alignment film that is arranged on a surface of the second substrate that is close to the TFT substrate;

the liquid crystal layer comprising liquid crystal molecules that are set at a pre-tilt angle for being nearly vertically aligned; on a plane substantially parallel to the TFT substrate and the CF substrate, the liquid crystal molecules and a direction of branch electrodes of the pixel electrode defining therebetween a direction angle θ; and the direction angle θ ranging from 0 to 45 degrees;

the first alignment film and the second alignment film being alignment films that allow for vertical light alignment; the first alignment film being subjected to first light irradiation treatment to have the first alignment film define a first pre-tilt angle with respect to the first base plate; the second alignment film being subjected to second light irradiation treatment to have the second alignment film define a second pre-tilt angle with respect to the second substrate; and the first and second pre-tilt angles ranging from 0 to 20 degrees;

an alignment direction of the first alignment film and an alignment direction of the second alignment film being opposite to and parallel with each other; and the liquid crystal molecules rotating horizontally upon application of an electric field for displaying;

wherein the TFT substrate further comprises scan lines extending in a horizontal direction and data lines extending in a vertical direction, the scan lines and the data lines intersecting each other on the TFT substrate to define a plurality of sub-pixel zones, each of the sub-pixel zones being provided with a pixel electrode;

wherein the pixel electrode comprises first and second areas, the first area comprising a plurality of first branch electrodes and a plurality of first slits between the plurality of first branch electrodes, the second area comprising a plurality of second branch electrodes and a plurality of second slits between the plurality of second branch electrodes; and an extension direction of the first slits and the vertical direction define therebetween a predetermined angle α and an extension direction of the second slits and the vertical direction define therebetween a predetermined angle −α; and wherein the liquid crystal molecules of the liquid crystal layer are subjected to an alignment process including individually subjecting the first alignment film and the second alignment film to exposure to ultraviolet light to allow the liquid crystal molecules to form a pre-tilt angle of a predetermined angle value, the ultraviolet light for exposure having a wavelength of 200-500 nm.

The efficacy of the present invention is that the present invention provides a liquid crystal display panel, which comprises a TFT substrate and a CF substrate that are respectively provided with first and second alignment films that allow for vertical light alignment, so that after irradiation of ultraviolet light, the first alignment film and the second alignment film have alignment directions that are substantially parallel but opposite to each other and the liquid crystal molecules are set at a tilt angle for being nearly vertically aligned. In a dark state where no electricity is applied, the liquid crystal molecules are arranged to be nearly perpendicular to surfaces of the TFT substrate and the CF substrate with no phase difference so that light leakage is extremely low and the dark state brightness is small thereby achieving a relatively high contrast; and after the application of a displaying electric field, the liquid crystal molecules are cause to rotate on a plane substantially parallel to the surfaces of the TFT substrate and the CF substrate so as to provide characteristics of a wide view angle and high transmittance offered by an IPS mode and an FFS mode.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will become apparent from the following detailed description of an embodiment of the present invention, with reference to the attached drawings.

In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

The present invention provides a liquid crystal display panel. The liquid crystal display panel is applicable to serving as a liquid crystal display panel of an in-plane switching (IPS) mode or a fringe field switching (FFS) mode, in which, when an electric field for displaying purposes is applied, liquid crystal molecules are caused to rotate on a plane that is substantially parallel to a substrate. The FFS mode will be taken as an example in the following description.

Figure 5:
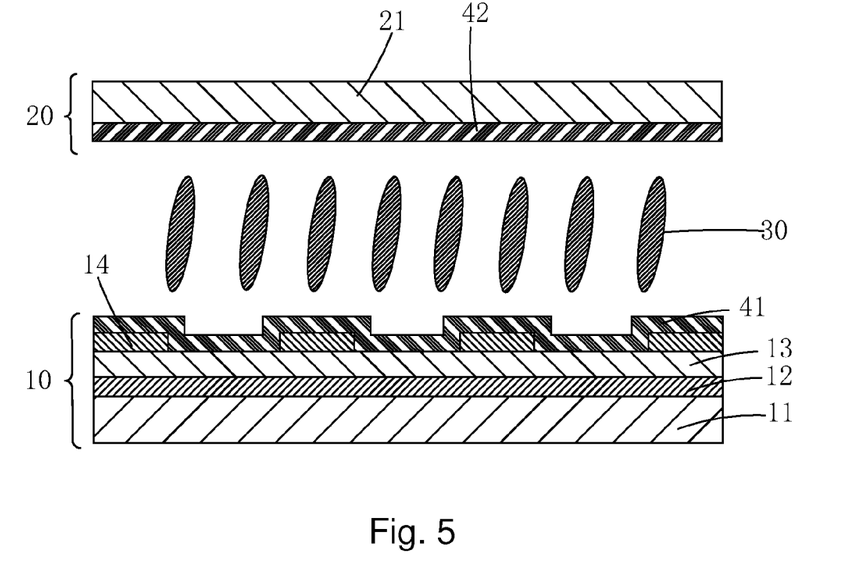
FIG. 5 is a schematic view illustrating the state of liquid crystal molecules contained in the liquid crystal display panel of the present invention when no electric field is applied.

Referring to FIG. 5, the present invention provides a liquid crystal display panel, which comprises a thin-film transistor (TFT) substrate 10, a color filter (CF) substrate 20 opposite to the TFT substrate 10, and a liquid crystal layer 30 interposed between the TFT substrate 10 and the CF substrate 20.

The TFT substrate 10 comprises a first base plate 11 and a common electrode 12, an insulation layer 13, a pixel electrode 14, and a first alignment film 41 that are sequentially stacked, from bottom to top, on a surface of the first base plate 11 that is close to the liquid crystal layer 30.

The CF substrate 20 comprises a second substrate 21 and a second alignment film 42 that is arranged on a surface of the second substrate 21 that is close to the TFT substrate 10.

The liquid crystal layer 30 contains liquid crystal molecules that are set at a pre-tilt angle for being nearly vertically aligned. On a plane substantially parallel to the TFT substrate 10 and the CF substrate 20, the liquid crystal molecules and a direction of branch electrodes of the pixel electrode 14 define therebetween a direction angle θ; and the direction angle θ ranges from 0 to 45 degrees.

The first alignment film 41 and the second alignment film 42 are alignment films that allow for vertical light alignment. The first alignment film 41 is subjected to first light irradiation treatment to have the first alignment film 41 define a first pre-tilt angle with respect to the first base plate 11; and the second alignment film 42 is subjected to second light irradiation treatment to have the second alignment film 42 define a second pre-tilt angle with respect to the second substrate 21. The first and second pre-tilt angles range from 0 to 20 degrees.

An alignment direction of the first alignment film 41 and an alignment direction of the second alignment film 42 are opposite to and are parallel with each other.

Specifically, an alignment process for the liquid crystal molecules of the liquid crystal layer 30 is such that the first alignment film 41 and the second alignment film 42 are individually subjected to exposure to ultraviolet light to allow the liquid crystal molecules to form a pre-tilt angle of a predetermined angle value. The ultraviolet light for exposure has a wavelength of 200-500 nm.

Figure 4:
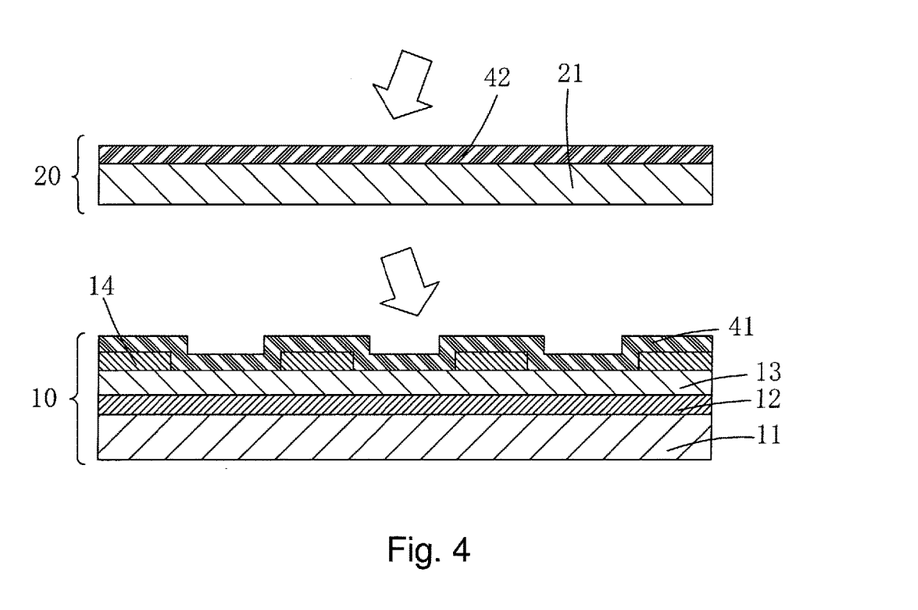
FIG. 4 is a schematic view illustrating a light alignment process of a first alignment film and a second alignment film of a liquid crystal display panel according to the present invention.
Figure 6:
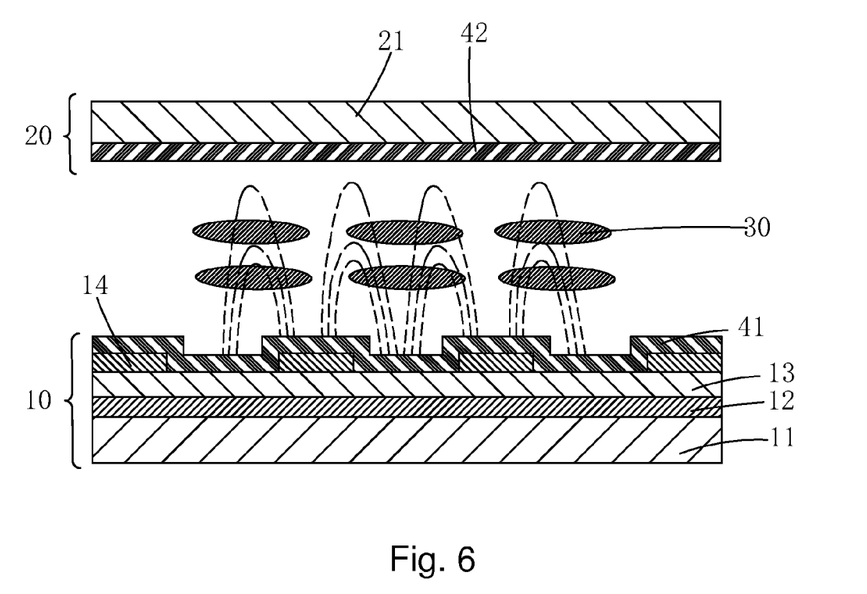
FIG. 6 is a schematic view illustrating the state of liquid crystal molecules contained in the liquid crystal display panel of the present invention when an electric field is applied.

As shown in FIG. 6, when an electric field for displaying purposes is applied, the liquid crystal molecules rotate horizontally. Specifically, as shown in FIG. 4, the first alignment film 41 and the second alignment film 42 are alignment films that can be aligned by means of UV light so that through irradiating the alignment films with UV light, a photochemical reaction occurs to achieve alignment.

Specifically, the TFT substrate 10 further comprises scan lines 16 extending in a horizontal direction and data lines 17 extending in a vertical direction. The scan lines 16 and the data lines 17 intersect each other on the TFT substrate 10 to define a plurality of sub-pixel zones and each of the sub-pixel zones is provided with a pixel electrode 14.

Figure 7A:
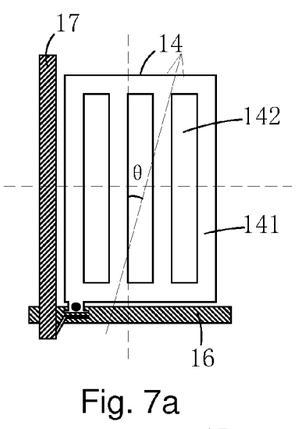
FIG. 7a is a schematic view illustrating an alignment direction of the first alignment film of the liquid crystal display panel according to a first embodiment of the present invention.
Figure 7B:
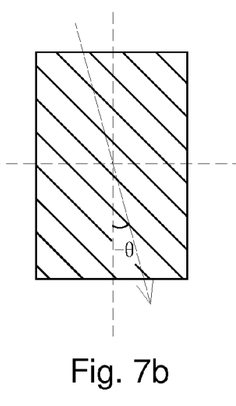
FIG. 7b is a schematic view illustrating an alignment direction of the second alignment film of the liquid crystal display panel according to the first embodiment of the present invention.
Figure 8:
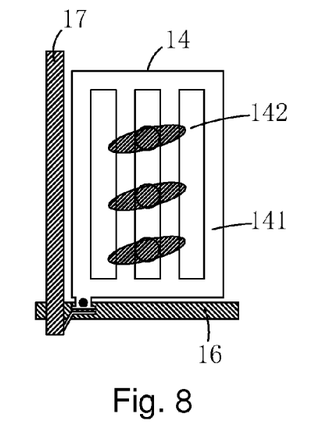
FIG. 8 is a schematic view illustrating an initial state of liquid crystal molecules of the liquid crystal display panel according to the first embodiment of the present invention and a state thereof when a displaying electric field is applied.

Referring to FIGS. 7a and 7b, which are schematic views respectively illustrating alignment directions of the first alignment film and the second alignment film of the liquid crystal display panel according to a first embodiment of the present invention, the pixel electrode 14 comprises a plurality of branch electrodes 141 and a plurality of slits 142 between the plurality of branch electrodes 141. The slits 142 extend in a direction that is the vertical direction. The TFT substrate 10 and the CF substrate 20 are individually irradiated with UV light so as to have the alignment direction of the first alignment film 41 and the extension direction of the slits 142 define therebetween an angle θ, and to have the alignment direction of the second alignment film 42 and the extension direction of the slits 142 define therebetween an angle −θ, and the alignment direction of the first alignment film 41 and the alignment direction of the second alignment film 42 are opposite. In the instant embodiment, the liquid crystal contained in the liquid crystal layer 30 is positive liquid crystal and since the positive liquid crystal molecules rotate in a direction that is parallel to a direction of an electric field, when an electric field for displaying purposes is applied, as shown in FIG. 8, the positive liquid crystal molecules contained in the liquid crystal layer 30 are caused to rotate on a plane that is parallel to the TFT substrate 10 and the CF substrate 20.

Figure 9A:
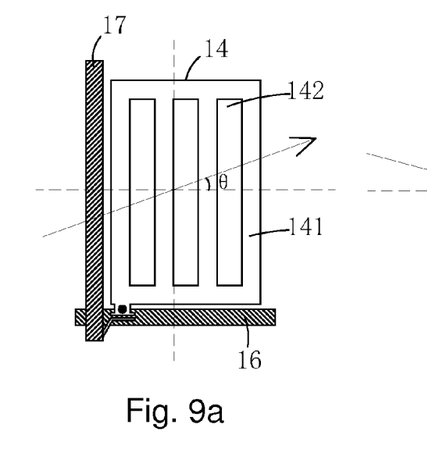
FIG. 9a is a schematic view illustrating an alignment direction of the first alignment film of the liquid crystal display panel according to a second embodiment of the present invention.
Figure 9B:
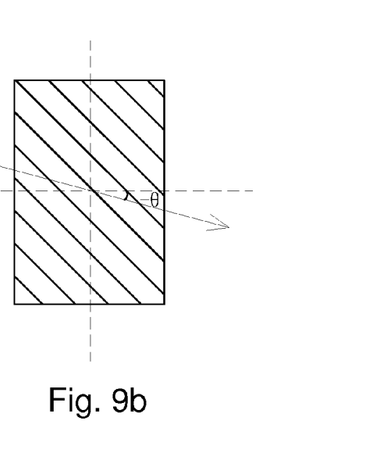
FIG. 9b is a schematic view illustrating an alignment direction of the second alignment film of the liquid crystal display panel according to the second embodiment of the present invention.
Figure 10:
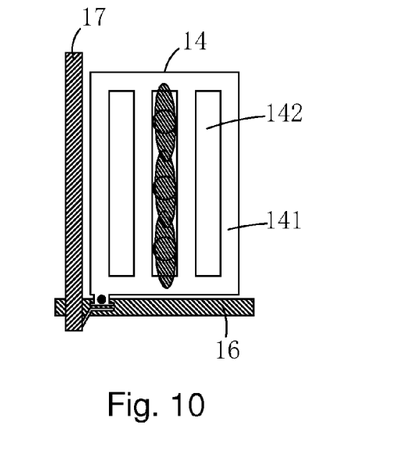
FIG. 10 is a schematic view illustrating an initial state of liquid crystal molecules of the liquid crystal display panel according to the second embodiment of the present invention and a state thereof when a displaying electric field is applied.

Referring to FIGS. 9a and 9b, which are schematic views respectively illustrating alignment directions of the first alignment film and the second alignment film of the liquid crystal display panel according to a second embodiment of the present invention, the pixel electrode 14 comprises a plurality of branch electrodes 141 and a plurality of slits 142 between the plurality of branch electrodes 141. The slits 142 extend in a direction that is the vertical direction. The TFT substrate 10 and the CF substrate 20 are individually irradiated with UV light so as to have the alignment direction of the first alignment film 41 and the horizontal direction define therebetween an angle θ and to have the alignment direction of the second alignment film 42 and the horizontal direction define therebetween an angle −θ, and the alignment direction of the first alignment film 41 and the alignment direction of the second alignment film 42 are opposite. In the instant embodiment, the liquid crystal contained in the liquid crystal layer 30 is negative liquid crystal and when an electric field for displaying purposes is applied, the liquid crystal molecules are rotated in the direction shown in FIG. 10.

Figure 11A:
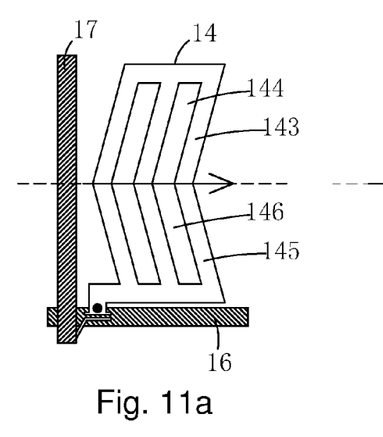
FIG. 11a is a schematic view illustrating an alignment direction of the first alignment film of the liquid crystal display panel according to a third embodiment of the present invention.
Figure 11B:
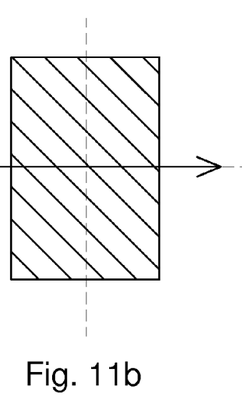
FIG. 11b is a schematic view illustrating an alignment direction of the second alignment film of the liquid crystal display panel according to the third embodiment of the present invention.
Figure 12:
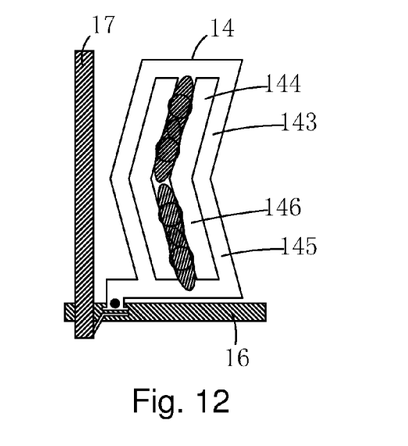
FIG. 12 is a schematic view illustrating an initial state of liquid crystal molecules of the liquid crystal display panel according to the third embodiment and a fifth embodiment of the present invention and a state thereof when a displaying electric field is applied.

Referring to FIGS. 11a and 11b, which are schematic views respectively illustrating alignment directions of the first alignment film and the second alignment film of the liquid crystal display panel according to a third embodiment of the present invention, the pixel electrode 14 comprises first and second areas. The first area comprises a plurality of first branch electrodes 143 and a plurality of first slits 144 between the plurality of first branch electrodes 143; and the second area comprises a plurality of second branch electrodes 145 and a plurality of second slits 146 between the plurality of second branch electrodes 145. An extension direction of the first slits 144 and the vertical direction define therebetween a predetermined angle α. An extension direction of the second slits 146 and the vertical direction define therebetween a predetermined angle −α. The TFT substrate 10 and the CF substrate 20 are individually irradiated with UV light so as to have the alignment direction of the first alignment film 41 in the horizontal direction and the alignment direction of the second alignment film 42 also in the horizontal direction but opposite to the alignment direction of the first alignment film 41. In the instant embodiment, the liquid crystal contained in the liquid crystal layer 30 is negative liquid crystal and when an electric field for displaying purposes is applied, the liquid crystal molecules are rotated in the direction shown in FIG. 12.

Figure 13A:
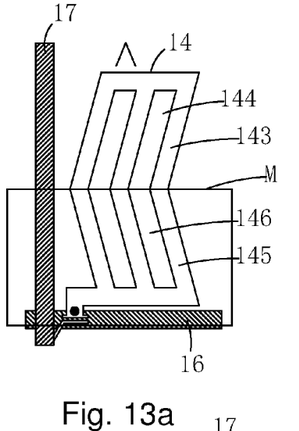
FIGS. 13a-13b are schematic views illustrating an alignment process of the first alignment film of the liquid crystal display panel according to a fourth embodiment of the present invention.
Figure 13B:
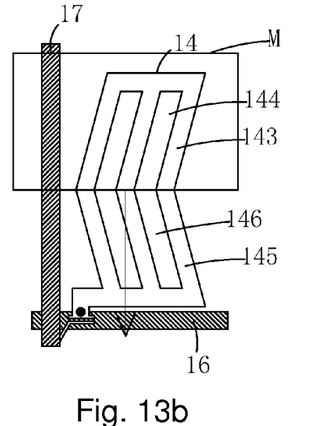
Figure 14:
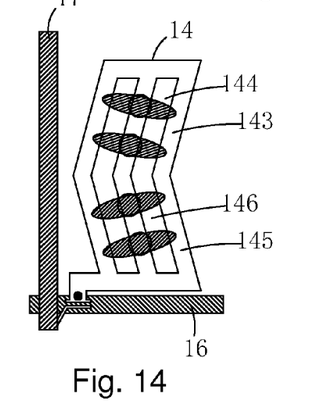
FIG. 14 is a schematic view illustrating an initial state of liquid crystal molecules of the liquid crystal display panel according to the fourth embodiment of the present invention and a state thereof when a displaying electric field is applied.

Referring to FIGS. 13a-13b, which are schematic views illustrating an alignment process of the first alignment film of the liquid crystal display panel according to a fourth embodiment of the present invention, the pixel electrode 14 comprises first and second areas. The first area comprises a plurality of first branch electrodes 143 and a plurality of first slits 144 between the plurality of first branch electrodes 143; and the second area comprises a plurality of second branch electrodes 145 and a plurality of second slits 146 between the plurality of second branch electrodes 145. An extension direction of the first slits 144 and the vertical direction define therebetween a predetermined angle α. An extension direction of the second slits 146 and the vertical direction define therebetween a predetermined angle −α. A mask M is used to shield a portion of the first alignment film 41 that corresponds to the second area to conduct irradiation of UV light so that an alignment direction of the first alignment film 41 that corresponds to the first area is in a vertical upward direction; and a mask M is used to shield a portion of the first alignment film 41 that corresponds to the first area to conduct irradiation of UV light so that an alignment direction of the first alignment film 41 that corresponds to the second area is in a vertical downward direction, whereby two domains are defined in a sub-pixel zone in which the liquid crystal molecules, upon application of voltage, rotate by different angles. Similarly, a mask M is used to shield a portion of the second alignment film 42 that corresponds to the second area to conduct irradiation of UV light so that an alignment direction of the second alignment film 42 that corresponds to the first area is in a vertical downward direction; and a mask M is used to shield a portion of the second alignment film 42 that corresponds to the first area to conduct irradiation of UV light so that an alignment direction of the second alignment film 42 that corresponds to the second area is in a vertical upward direction. In the instant embodiment, the liquid crystal contained in the liquid crystal layer 30 is positive liquid crystal and when an electric field for displaying purposes is applied, the liquid crystal molecules are rotated in the direction shown in FIG. 14.

Figure 15A:
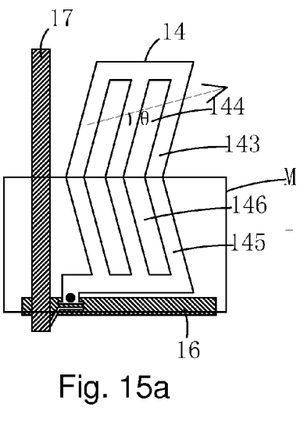
FIGS. 15a-15b are schematic views illustrating an alignment process of the first alignment film of the liquid crystal display panel according to the fifth embodiment of the present invention.
Figure 15B:
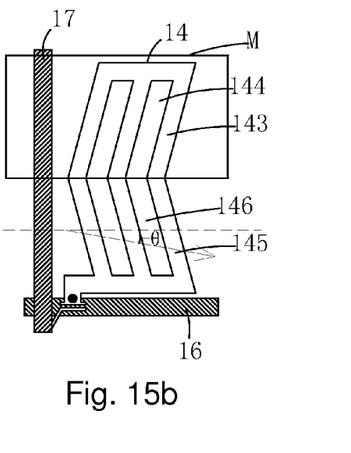

Referring to FIGS. 15a-15b, which are schematic views illustrating an alignment process of the first alignment film of the liquid crystal display panel according to a fifth embodiment of the present invention, the pixel electrode 14 comprises first and second areas. The first area comprises a plurality of first branch electrodes 143 and a plurality of first slits 144 between the plurality of first branch electrodes 143; and the second area comprises a plurality of second branch electrodes 145 and a plurality of second slits 146 between the plurality of second branch electrodes 145. An extension direction of the first slits 144 and the vertical direction define therebetween a predetermined angle α. An extension direction of the second slits 146 and the vertical direction define therebetween a predetermined angle −α. A mask M is used to shield a portion of the first alignment film 41 that corresponds to the second area to conduct irradiation of UV light so that an alignment direction of the first alignment film 41 that corresponds to the first area and the horizontal direction define therebetween an angle θ; and a mask M is used to shield another half area that is a port of the first alignment film 41 that corresponds to the first area to conduct irradiation of UV light so that an alignment direction of the first alignment film 41 that corresponds to the second area and the horizontal direction define therebetween an angle −θ, whereby two domains are defined in a sub-pixel zone in which the liquid crystal molecules, upon application of voltage, rotate by different angles. Similarly, a mask M is used to shield a portion of the second alignment film 42 that corresponds to the second area to conduct irradiation of UV light so that an alignment direction of the second alignment film 42 that corresponds to the first area and the horizontal direction define therebetween an angle −θ; and a mask M is used to shield a portion of the second alignment film 42 that corresponds to the first area to conduct irradiation of UV light so that an alignment of the second alignment film 42 that corresponds to the second area and the horizontal direction define therebetween an angle θ. In the instant embodiment, the liquid crystal contained in the liquid crystal layer 30 is negative liquid crystal and when an electric field for displaying purposes is applied, the liquid crystal molecules are rotated in the direction shown in FIG. 12.

In summary, the present invention provides a liquid crystal display panel, which comprises a TFT substrate and a CF substrate that are respectively provided with first and second alignment films that allow for vertical light alignment, so that after irradiation of ultraviolet light, the first alignment film and the second alignment film have alignment directions that are substantially parallel but opposite to each other and the liquid crystal molecules are set at a tilt angle for being nearly vertically aligned. In a dark state where no electricity is applied, the liquid crystal molecules are arranged to be nearly perpendicular to surfaces of the TFT substrate and the CF substrate with no phase difference so that light leakage is extremely low and the dark state brightness is small thereby achieving a relatively high contrast; and after the application of a displaying electric field, the liquid crystal molecules are cause to rotate on a plane substantially parallel to the surfaces of the TFT substrate and the CF substrate so as to provide characteristics of a wide view angle and high transmittance offered by an IPS mode and an FFS mode.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display panel, comprising a thin-film transistor (TFT) substrate, a color filter (CF) substrate opposite to the TFT substrate, and a liquid crystal layer interposed between the TFT substrate and the CF substrate;
    the TFT substrate comprising a first base plate and a common electrode, an insulation layer, a pixel electrode, and a first alignment film that are sequentially stacked, from bottom to top, on a surface of the first base plate that is close to the liquid crystal layer;
    the CF substrate comprising a second substrate and a second alignment film that is arranged on a surface of the second substrate that is close to the TFT substrate;
    the liquid crystal layer comprising liquid crystal molecules that are set at a pre-tilt angle for being nearly vertically aligned; on a plane substantially parallel to the TFT substrate and the CF substrate, the liquid crystal molecules and a direction of branch electrodes of the pixel electrode defining therebetween a direction angle θ; and the direction angle θ ranging from 0 to 45 degrees;
    the first alignment film and the second alignment film being alignment films that allow for vertical light alignment; the first alignment film being subjected to first light irradiation treatment to have the first alignment film define a first pre-tilt angle with respect to the first base plate; the second alignment film being subjected to second light irradiation treatment to have the second alignment film define a second pre-tilt angle with respect to the second substrate; and the first and second pre-tilt angles ranging from 0 to 20 degrees;
    an alignment direction of the first alignment film and an alignment direction of the second alignment film being opposite to and parallel with each other; and
    the liquid crystal molecules rotating horizontally upon application of an electric field for displaying.

2. The liquid crystal display panel as claimed in claim 1, wherein the TFT substrate further comprises scan lines extending in a horizontal direction and data lines extending in a vertical direction, the scan lines and the data lines intersecting each other on the TFT substrate to define a plurality of sub-pixel zones, each of the sub-pixel zones being provided with a pixel electrode.

3. The liquid crystal display panel as claimed in claim 2, wherein the pixel electrode comprises a plurality of branch electrodes and a plurality of slits between the plurality of branch electrode, the slits extending in a direction that is the vertical direction.

4. The liquid crystal display panel as claimed in claim 3, wherein the alignment direction of the first alignment film and the extension direction of the slits define therebetween an angle θ and the alignment direction of the second alignment film and the extension direction of the slits define therebetween an angle $-\theta$; and the liquid crystal of the liquid crystal layer is positive liquid crystal.

5. The liquid crystal display panel as claimed in claim 3, wherein the alignment direction of the first alignment film and the horizontal direction define therebetween an angle $\theta$ and the alignment direction of the second alignment film and the extension direction of the horizontal direction define therebetween an angle $-\theta$; and the liquid crystal of the liquid crystal layer is negative liquid crystal.

6. The liquid crystal display panel as claimed in claim 2, wherein the pixel electrode comprises first and second areas, the first area comprising a plurality of first branch electrodes and a plurality of first slits between the plurality of first branch electrodes, the second area comprising a plurality of second branch electrodes and a plurality of second slits between the plurality of second branch electrodes; and an extension direction of the first slits and the vertical direction define therebetween a predetermined angle $\alpha$ and an extension direction of the second slits and the vertical direction define therebetween a predetermined angle $-\alpha$.

7. The liquid crystal display panel as claimed in claim 6, wherein the alignment direction of the first alignment film is in the horizontal direction and the alignment direction of the second alignment film is also in the horizontal direction; and the liquid crystal of the liquid crystal layer is negative liquid crystal.

8. The liquid crystal display panel as claimed in claim 6, wherein the alignment of the first alignment film corresponding to the first area of the pixel electrode is in a vertical upward direction and the alignment direction of the first alignment film corresponding to the second area of the pixel electrode is in a vertical downward so as to define two domains of one of the sub-pixel zones in which the liquid crystal molecules, upon application of voltage, rotate by different angles; the alignment direction of the second alignment film corresponding to the first area of the pixel electrode is in the vertical downward direction and the alignment direction of the second alignment film corresponding to the second area of the pixel electrode is in the vertical upward direction; and the liquid crystal of the liquid crystal layer is positive liquid crystal.

9. The liquid crystal display panel as claimed in claim 6, wherein the alignment direction of the first alignment film corresponding to the first area of the pixel electrode and the horizontal direction define therebetween an angle $\theta$ and the alignment direction of the first alignment film corresponding to the second area of the pixel electrode the second area and the horizontal direction define therebetween an angle $-\theta$ so as to define two domains of one of the sub-pixel zones in which the liquid crystal molecules, upon application of voltage, rotate by different angles; the alignment direction of the second alignment film corresponding to the first area of the pixel electrode and the horizontal direction therebetween define an angle $-\theta$ and the alignment direction of the second alignment film corresponding to the second area of the pixel electrode and the horizontal direction define therebetween an angle $\theta$; the liquid crystal of the liquid crystal layer is negative liquid crystal.

10. The liquid crystal display panel as claimed in claim 1, wherein the liquid crystal molecules of the liquid crystal layer are subjected to an alignment process including individually subjecting the first alignment film and the second alignment film to exposure to ultraviolet light to allow the liquid crystal molecules to form a pre-tilt angle of a predetermined angle value, the ultraviolet light for exposure having a wavelength of 200-500 nm.

11. A liquid crystal display panel, comprising a thin-film transistor (TFT) substrate, a color filter (CF) substrate opposite to the TFT substrate, and a liquid crystal layer interposed between the TFT substrate and the CF substrate;
the TFT substrate comprising a first base plate and a common electrode, an insulation layer, a pixel electrode, and a first alignment film that are sequentially stacked, from bottom to top, on a surface of the first base plate that is close to the liquid crystal layer;
the CF substrate comprising a second substrate and a second alignment film that is arranged on a surface of the second substrate that is close to the TFT substrate;
the liquid crystal layer comprising liquid crystal molecules that are set at a pre-tilt angle for being nearly vertically aligned; on a plane substantially parallel to the TFT substrate and the CF substrate, the liquid crystal molecules and a direction of branch electrodes of the pixel electrode defining therebetween a direction angle $\theta$; and the direction angle $\theta$ ranging from 0 to 45 degrees;
the first alignment film and the second alignment film being alignment films that allow for vertical light alignment; the first alignment film being subjected to first light irradiation treatment to have the first alignment film define a first pre-tilt angle with respect to the first base plate; the second alignment film being subjected to second light irradiation treatment to have the second alignment film define a second pre-tilt angle with respect to the second substrate; and the first and second pre-tilt angles ranging from 0 to 20 degrees;
an alignment direction of the first alignment film and an alignment direction of the second alignment film being opposite to and parallel with each other; and
the liquid crystal molecules rotating horizontally upon application of an electric field for displaying;
wherein the TFT substrate further comprises scan lines extending in a horizontal direction and data lines extending in a vertical direction, the scan lines and the data lines intersecting each other on the TFT substrate to define a plurality of sub-pixel zones, each of the sub-pixel zones being provided with a pixel electrode;
wherein the pixel electrode comprises first and second areas, the first area comprising a plurality of first branch electrodes and a plurality of first slits between the plurality of first branch electrodes, the second area comprising a plurality of second branch electrodes and a plurality of second slits between the plurality of second branch electrodes; and an extension direction of the first slits and the vertical direction define therebetween a predetermined angle $\alpha$ and an extension direction of the second slits and the vertical direction define therebetween a predetermined angle $-\alpha$; and
wherein the liquid crystal molecules of the liquid crystal layer are subjected to an alignment process including individually subjecting the first alignment film and the second alignment film to exposure to ultraviolet light to allow the liquid crystal molecules to form a pre-tilt angle of a predetermined angle value, the ultraviolet light for exposure having a wavelength of 200-500 nm.

12. The liquid crystal display panel as claimed in claim 11, wherein the alignment direction of the first alignment film is in the horizontal direction and the alignment direction of the second alignment film is also in the horizontal direction; and the liquid crystal of the liquid crystal layer is negative liquid crystal.

13. The liquid crystal display panel as claimed in claim 11, wherein the alignment of the first alignment film corresponding to the first area of the pixel electrode is in a vertical upward direction and the alignment direction of the first alignment film corresponding to the second area of the pixel electrode is in a vertical downward so as to define two domains of one of the sub-pixel zones in which the liquid crystal molecules, upon application of voltage, rotate by different angles; the alignment direction of the second alignment film corresponding to the first area of the pixel electrode is in the vertical downward direction and the alignment direction of the second alignment film corresponding to the second area of the pixel electrode is in the vertical upward direction; and the liquid crystal of the liquid crystal layer is positive liquid crystal.

14. The liquid crystal display panel as claimed in claim 11, wherein the alignment direction of the first alignment film corresponding to the first area of the pixel electrode and the horizontal direction define therebetween an angle $\theta$ and the alignment direction of the first alignment film corresponding to the second area of the pixel electrode the second area and the horizontal direction define therebetween an angle $-\theta$ so as to define two domains of one of the sub-pixel zones in which the liquid crystal molecules, upon application of voltage, rotate by different angles; the alignment direction of the second alignment film corresponding to the first area of the pixel electrode and the horizontal direction therebetween define an angle $-\theta$ and the alignment direction of the second alignment film corresponding to the second area of the pixel electrode and the horizontal direction define therebetween an angle $\theta$; the liquid crystal of the liquid crystal layer is negative liquid crystal.

* * * * *